United States Patent [19]

Uno et al.

[11] 4,141,633
[45] Feb. 27, 1979

[54] EXPOSURE CONTROL DEVICE

[75] Inventors: Naoyuki Uno, Urawa; Tetsuji Shono, Saitama; Fumio Urano, Omiya; Masahiro Kawasaki, Tokyo, all of Japan

[73] Assignee: Asahi Kogaku Kogyo Kabushiki Kaisha, Tokyo, Japan

[21] Appl. No.: 845,746

[22] Filed: Oct. 26, 1977

Related U.S. Application Data

[63] Continuation of Ser. No. 643,658, Dec. 23, 1975, abandoned.

[30] Foreign Application Priority Data

Dec. 26, 1974 [JP] Japan ................................. 50-3777

[51] Int. Cl.$^2$ .............................................. G03B 7/08
[52] U.S. Cl. ....................................... 354/24; 354/38; 354/60 E
[58] Field of Search ................... 354/23 R, 23 D, 24, 354/26, 28, 29, 30, 37, 38, 39, 40, 41, 43, 45, 47, 48, 50, 51, 60 R, 60 E

[56] References Cited

U.S. PATENT DOCUMENTS

| 3,554,104 | 1/1971 | Winkler et al. | 354/38 |
| 3,638,544 | 2/1972 | Kitai | 354/51 |
| 3,829,867 | 8/1974 | Ono | 354/28 |
| 3,863,263 | 1/1975 | Itagaki | 354/24 |
| 3,896,456 | 7/1975 | Toyoda | 354/24 |
| 3,896,460 | 7/1975 | Sahara et al. | 354/38 |
| 3,945,024 | 3/1976 | Hasegawa et al. | 354/29 |
| 3,950,765 | 4/1976 | Nanba et al. | 354/29 |
| 3,964,073 | 6/1976 | Korbori et al. | 354/60 R |
| 4,042,940 | 8/1977 | Matsuda et al. | 354/38 |
| 4,062,023 | 12/1977 | Kobori et al. | 354/38 |

FOREIGN PATENT DOCUMENTS 2434152 2/1975 Fed. Rep. of Germany ........ 354/23 D

Primary Examiner—Russell E. Adams
Attorney, Agent, or Firm—Sughrue, Rothwell, Mion, Zinn and Macpeak

[57] ABSTRACT

An automatic exposure control circuit for a camera is disclosed. The circuit is capable of automatically controlling the shutter speed when the diaphragm is manually set, and is capable of automatically controlling the diaphragm opening when the shutter speed is manually set. In both cases the same transducer is used for the manual diaphragm or shutter speed selection.

9 Claims, 2 Drawing Figures

EXPOSURE CONTROL DEVICE

This is a continuation of Application Ser. No. 643,658 filed Dec. 23, 1975, now abandoned.

CROSS REFERENCE TO RELATED APPLICATIONS

Reference is made to the following two related applications which are incorporated herein by reference:
(1) "Exposure Control Device" by Naoyuki Uno, Tetsuji Shono, Fumio Urano and Masahiro Kawasaki, U.S. application Ser. No. 644,018, and
(2) "Automatic Exposure Control Device" by Masahiro Kawasaki, U.S. application Ser. No. 644,012.

BACKGROUND OF THE INVENTION

This invention relates to an automatic exposure controlled camera which is capable of controlling shutter speed in accordance with a manually set diaphragm (hereinafter referred to as "ES" mode operation) and controlling the diaphragm in accordance with a manually set shutter speed (hereinafter referred to as "EE" mode operation).

It is known in the art to provide ES camera operation wherein the diaphragm is manually set and the shutter speed is automatically controlled. Further, it is known in the art to provide EE camera operation wherein the shutter speed is manually set and the diaphragm is automatically controlled. However, as is well known both methods have their distinct advantages and disadvantages relative to one another. Heretofore it has been considered cumbersome and highly complicated to include both EE and ES operation in a camera.

SUMMARY OF THE INVENTION

It is therefore an object of the present invention to provide an exposure control circuit for a camera, wherein both EE and ES operations are provided and the circuit is not cumbersome nor as highly complex as prior control circuits.

The object of the present invention is to simplify the structure of a camera and reduce the number of elements constituting the camera to lower the cost thereof without lowering the accuracy.

These and other objects of the invention are accomplished by providing an exposure control circuit in which a single transducer is switchably controlled to set the manual exposure value of either ES or EE operation.

DETAILED DESCRIPTION OF THE INVENTION

Figure 1:
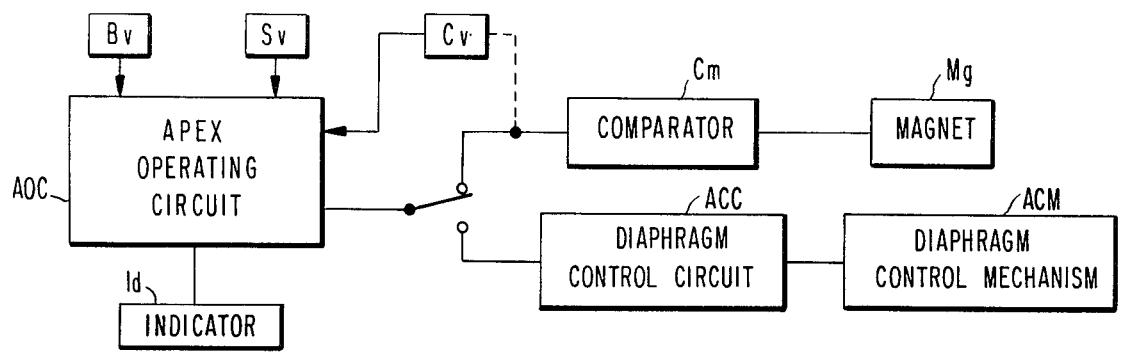
FIG. 1 is a block diagram of the exposure control device in accordance with the present invention.

FIG. 1 is a block diagram generally showing an embodiment of the invention in which Bv and Sv indicate transducers for developing electrical signals corresponding to APEX values of the scene brightness and film sensitivity, respectively. Examples of such transducers are a silicon photo-diode and a variable resistor, respectively. A common transducer CV develops signals corresponding to the APEX values of Tv or Av showing the manually set exposure time and manually set diaphragm, respectively and is selectively used to indicate one of the two values. The common transducer Cv is a variable resistor or the like. The APEX operating circuit is a circuit which provides an output corresponding to a desired APEX value based the standard formula of photography, $Bv + Sv = Tv + Av$. In the analogue circuit employed in the embodiment described in connection with FIG. 2, voltages are generated which are proportional to APEX values Bv, Sv, Tv and Av by means of the transducers and logarithmic compression elements (such as transistors or diodes), so as to permit the APEX values be added and subtracted in the circuit.

A time constant circuit comprising comparator Cm and magnet Mg, is the same as those employed in known ES type circuits. When the output of the APEX operating circuit AOC is the APEX value Tv, the latter is converted to a shutter speed control signal in the time constant circuit. Specifically, as is well known in the art the supply of current to the magnet Mg is controlled by the comparator Cm. The automatic diaphragm control mechanism ACM is the same as those employed in known EE type control mechanisms, and a conventionally used ammeter-step cam type mechanism or a clamp type mechanism including an electromagnetic means is used therein.

When the device of the present invention is used as an ES type control device, an output depending upon Cv, Bv and Av is also put into the time constant circuit, and the shutter speed is automatically controlled to obtain a correct exposure. When the device is used as an EE type control device, the output Cv is connected to the manual exposure time control mechanism. Also the output Cv is combined with Bv and Sv in the APEX operating circuit to provide an output corresponding to Av. The latter Av is applied to the diaphragm control circuit ACC and then to the automatic diaphragm control mechanism ACM, thereby controlling the aperture of the diaphragm automatically to obtain correct exposure. It is possible to use Cv simply as Tv for the APEX operation and to control the time manually. Also, it is possible to connect Cv, as indicated by the chain line in the block diagram to electrically control the time. The indicator Id, which may be an ammeter, indicates Tvout or Avout in case of ES or EE operation, respectively. An LED or LCD element can also be used therefor. Further, the pointer of the ammeter serves as an indicator of an exposure meter when the camera is not used in either the ES or the EE modes.

Figure 2:
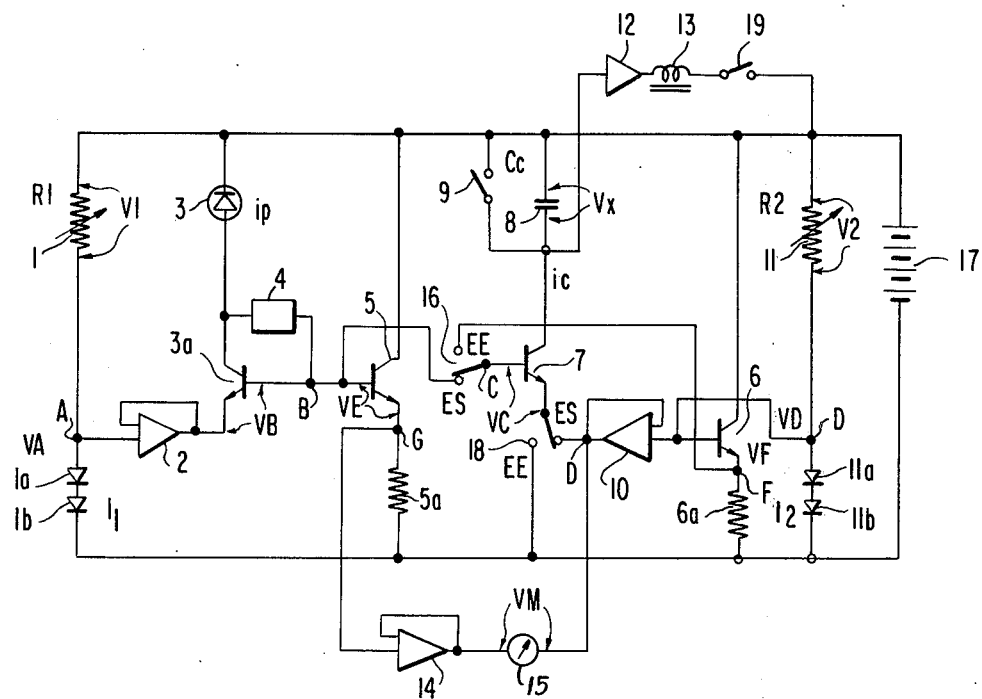
FIG. 2 is a circuit diagram of a preferred embodiment of the present invention.

A specific embodiment of the device of FIG. 1 is shown in FIG. 2. A variable resistor 1, manually set in accordance with the film sensitivity, is connected in series with log compression diodes 1a and 1b across the constant voltage power source 17. The connecting point A between the variable resistor 1 and the diode 1a is connected with the input terminal of an operational amplifier 2 connected as a voltage follower circuit. A photo-diode 3, for developing a Bv signal, is connected to the collector of a log compression transistor 3a, the collector of which is connected with the base B thereof by way of a buffer circuit 4. A variable resistor 11 corresponding to the manually set exposure time Tv and the manually set diaphragm Av is connected in series with log compression diodes 11a and 11b across the constant voltage source 17, and the connecting point D therebetween is connected with the input terminal of the operational amplifier 10, which is connected as a voltage follower circuit. A log expansion transistor 7 has an emitter which is connected, by way of an ES-EE change-over switch 18, to the output terminal D' of the operational amplifier 10 for ES mode operation and to the ground line for EE mode operation. The base C of transistor 7 is connected to a change-over switch 16, and the collector thereof is connected with an integrating capacitor 8 and a timing switch 9. Further, the collector is connected to the input terminal of the comparator 12, and a magnet 13 is connected to the output terminal of the comparator 12. A transistor 5, formed into an emitter follower circuit, has its base connected to point B for level shifting. Also the ES terminal of change-over switch 16 is connected to the point B. A transistor 6 and a resistor 6a are formed into an emitter follower circuit for level shifting. The base of transistor 6 is connected to the point D, and the connecting point F, between transistor 6 and resistor 6a, is connected to the EE terminal of the change-over switch 16. The connecting point G, between the emitter of the level shift transistor 5 and the resistor 5a, is connected with the input terminal of the operational amplifier 14, and the output terminal of the operational amplifier 14 is connected to one terminal of an ammeter 15 for indicating Tv during ES mode operation and for indicating Av during EE mode operation. The other terminal of the ammeter 15 is connected with the output terminal D' of the operational amplifier 10.

The operation of the latter circuit will now be described. Where the resistance of the variable resistor 1 is defined as $R_1$, the terminal voltage thereof is defined as $V_1$, and the current flowing through the log compression diodes 1a and 1b is $i_1$, the relationship is:

$$i_1 = V_1/R_1 \tag{1}$$

The voltage $V_A$ at the point A is:

$$V_A = 2 \cdot h \log(i_1/i_s) \tag{2}$$

resulting from the logarithmic compression characteristic of the diodes, where $h = K \cdot T/g$, and K: Boltzmann constant
T: absolute temperature
g: charge of an electron
$i_s$: saturation current in the direction of diode.

The log compression characteristic of the diodes 1a, 1b, 11a and 11b and that between the base and emitter of the transistors 3a and 7 are assumed here to be equal to each other. The base-emitter voltage $V_B$ of the transistor 3a is $$V_B = h \log(i_p/i_s) \tag{3}$$

where $i_p$ is the photo-current of the photo-diode. Similarly, the current $i_2$ flowing through diodes 11a and 11b is $$i_2 = V_2/R_2 \tag{4}$$

where the resistance of the variable resistor 11 is $R_2$ and the terminal voltage thereof is $V_2$. The voltage $V_D$ at the point D is $$V_D = 2h \log(i_2/i_s) \tag{5}$$

The resistance of the variable resistor 1 is set to correspond to the film sensitivity, i.e., the APEX indicated value Sv. The resistance of variable resistor 11 is set to correspond to the value Cv, representing Tv or Av. The relationship is as follows;

$$R_1 = k_1 \cdot 2^{-0.5Sv} \tag{6}$$

$$R_2 = k_2 \cdot 2^{-0.5Cv} \tag{7}$$

where $k_1$ and $k_2$ are proportional constants.

The photo-current of the photo-diode 3 indicated by $i_p$ and the APEX value Bv of the scene brightness B have a relation as follows;

$$i_p = k_4 B = k_3 \cdot 2^{Bv} \tag{8}$$

where $k_3$ and $k_4$ are proportion constants.

The voltage $V_C$ between the base and the emitter of the log expansion transistor 7 is represented as follows when the switches are connected to the ES terminals;

$$V_C = V_A + V_B - V_D \tag{9}$$

The above formulae (1) to (9) are rewritten as follows;

$$V_C = h \log(k/i_s) \cdot 2^{(Bv+Sv-Cv)} \tag{10}$$

where $k = k_1^2 \cdot k_3/k_2^3$ and $V_1 = V_2$.*

* This condition, $V_1 = V_2$, exists even though $V_A$ may be very different from $V_D$. This is because most of the voltage 17 appears across $R_1$ and $R_2$. It should also be noted that all logarithms are to the base e, unless otherwise noted.

Then, the operation of the above circuit will be described with respect to the two different modes thereof.

For ES mode operation, the switches 16 and 18 are connected to the ES terminals as shown. By connecting the control dial of the variable resistor 11 to the manual diaphragm control mechanism, the formula (10) can be rewritten as follows with Cv changed to Av;

$$V_C = h \log(k/i_s) \cdot 2^{(Bv+Sv-Av)} \tag{11}$$

From the formula of APEX operation, $Tv = Bv + Sv - Av$, the formula (11) can be rewritten as follows;

$$V_C = h \log[(k/i_s) \cdot 2^{Tv}] \tag{12}$$

On the other hand, the relation between the base-emitter voltage $V_C$ of the log expansion transistor 7 and the collector current $i_c$ can be represented as follows;

$$V_C = h \log(i_c/i_s) \tag{13}$$

From the formulae (12) and (13), $$i_c = k \cdot 2^{Tv} \tag{14}$$

If the timing switch 9 is released in synchronization with the start of the leading shutter blind, the voltage Vx across the capacitor 8 increases as the time lapses as follows;

$$Vx = i_c \cdot t/Cc \tag{15}$$

where the capacity of the capacitor is Cc.

Where the standard voltage of the comparator Cm is Vs, the time from the release of the timing switch 9 to the end of the supply of current to the magnet 13, i.e., the time for the exposure time $t_1$ is represented as follows;

$$t_1 = Vs \cdot Cc/i_c \tag{16}$$

The formula (16) can be rewritten as follows by use of the formula (14);

$$t_1 = Vs \cdot (Cc/k) \cdot 2^{-Tv} \qquad (17).$$

When the values Vs, Cc and k are set to satisfy $Vs \cdot Cc/k = 1$ sec. in order to satisfy the definition of APEX indication of $t_1 = 1$ sec in case of $Tv = 0$, the time $t_1$ can be represented as follows;

$$t_1 = 2^{-Tv} \text{ [sec]} \qquad (18)$$

and the exposure time is automatically controlled to obtain correct exposure.

Under these conditions the ammeter 15 indicates the APEX value Tv. The terminal voltage $V_M$ of the ammeter 15 is represented as follows;

$$V_M = (V_A + V_B - V_D) - V_E = V_C - V_E \qquad (19)$$

where $V_E$ is the base-emitter voltage of the transistor 5. This formula can be rewritten as follows by introducing the formula (12) thereinto;

$$V_M = Tv \cdot h \log 2 + h \log(k/i_s) - V_E \qquad (20),$$

and the start point of the swing of the pointer of the ammeter 15 can be set at any desired position by properly selecting it with reference to $V_E$ and $h \log(k/i_s)$. For instance, by selecting $V_E$ so that $h \log(k/i_s) = V_E$ is satisfied, $V_M$ becomes equal to 0 when $Tv = 0$.

Referring now to the EE mode operation, the switch 16 and the switch 18 are connected to the EE terminals. By connecting the control dial of variable resistor 11 to the manual exposure time control mechanism, the following formula can be obtained from the formula (10) with Cv changed to Tv;

$$Vc = h \log[(k/i_s) \cdot 2^{Av}] \qquad (21).$$

When the base-emitter voltage of the transistor 5 is $V_E'$, the terminal voltage $V_M'$ of the ammeter 15 can be represented as follows with reference to the formulae (19), (20)

$$V_M' = Av \cdot h \log 2 + h \log(k/i_s) - V_E' \qquad (22).$$

As explained above, in connection with the description of the ES mode, the relation between the value Av and the swing of the pointer of the ammeter 15 can be made as desired by properly selecting $V_E'$. When the $V_E$ and $V_E'$ are different, the resistor 5a may be changed over. Under the relation of the Av obtained as above and the swing of the pointer of the ammeter, the pointer is clamped by a conventionally known method employing a step cam and the diaphragm can automatically be controlled to obtain correct exposure. Further, at this time, the Av value is also indicated simultaneously.

During the EE mode, the manually set exposure time is controlled by the voltage Vc as follows;

$$V_C = V_D - V_F \qquad (23)$$

which can be rewritten as follows by introducing thereto the formulae (4), (5) and (7);

$$V_C = h \log[(k'/i_s) \cdot 2^{Tv}] \qquad (24)$$

where Cv is changed to Tv in the formula (7) so that $V_F = h \log V_f$. Further, it is assumed that $k' = V_2^2/k_2^2 \cdot i_s \cdot V_f$. From the formulae (13) and (24), $$i_c = k' \cdot 2^{Tv} \qquad (25).$$

From formulae (15), (16) and (25), $$t_1 = V_s \cdot (C_c/k') \cdot 2^{-Tv} \qquad (26).$$

When it is set to satisfy $VsCc/k' = 1$ sec in order to satisfy the definition of APEX indication of $t_1 = 1$ sec in case of $Tv = 0$, the time $t_1$ can be represented as follows;

$$t_1 = 2^{-Tv} \text{ [sec]},$$

and the manual exposure time can be set. Further, it should be noted that k and k' are not determined independently of each other but have a relation with each other. In a practical device, various methods for determining both valves can be considered. For instance, k for the mode of ES is first determined and then for the mode of EE the value of $V_F$ is changed by controlling the resistance of the resistor 6a.

When the camera is operated in neither the ES nor EE modes, the exposure meter can be formed into a shutter following type or a diaphragm following type. Briefly, when the diaphragm following type is employed, the resistor 11 is related to the manually set exposure time and the switch 16 is connected to the EE terminal, i.e., connecting terminal C to terminal F, and the switch 18 is connected to ground as in the case of the EE mode. In this case, the pointer of the ammeter 15 indicates Av value and accordingly a follower pointer which is associated with the manual diaphragm control mechanism is provided so as to obtain the correct exposure by making the follower pointer aligned with the pointer of the ammeter.

When the shutter following type is employed, the resistor 11 is related to the manual diaphragm control mechanism and the switches 16 and 18 are made to be in the same state as that set in the diaphragm following type. Since the pointer of the ammeter 15 indicates Tv value at this time, a pointer which is associated with the manual exposure time control mechanism mechanically controlled is provided so that the correct exposure may be obtained when the pointer of the ammeter and the follower pointer are aligned with each other. Further, at this time, it is necessary to release the switch 19 so that the electronic shutter mechanism may not operate.

The operational relationship between the switches and mechanism of the three modes of ES, EE and manual control can be represented as indicated in the following table.

| Exposure Control Mode | Exposure Control | | | Indicator | Notes |
|---|---|---|---|---|---|
| | Switch 16 | Switch 18 | Cv (R11) | | |
| ES | C - B | D' | Av | Meter | Cv related to Manual Av |
| EE | C - F | ground | Tv | Meter | Cv related to Manual Tv |
| Manual (1) | C - F | ground | Av | Meter | Shutter following Shutter Mechanically Controlled |
| (2) | C - F | ground | Tv | Meter | Diaphragm following |

As described hereinabove, in accordance with the present invention, one common transducer is used to input Tv or Av into an APEX operating circuit manually, and accordingly, the mode of exposure control can be changed over between the EE mode (shutter speed is manually set) and the ES mode (diaphragm is manually set) in accordance with the condition of the object. Thus, the best condition can always be obtained in controlling exposure.

Further, since the common transducer is used for setting the exposure time Tv or the aperture size of the diaphragm Av selectively, the circuit is simplified and the cost of manufacture is lowered.

What is claimed is:

1. An exposure control device comprising: (a) an electromagnetic shutter speed control means, (b) an automatic diaphragm opening control means, (c) transducer means exclusively comprising: (1) a first transducer for developing a first voltage dependent upon scene brightness, (2) a second transducer for developing a second voltage dependent upon film speed, and (3) a third, dual purpose transducer for developing a third voltage and adapted to be controlled according to a manual setting of either shutter speed or diaphragm opening to provide said third voltage dependent thereon, and (d) circuit means selectably switchable between an automatic diaphragm opening control (EE) mode and an automatic shutter speed control (ES) mode and responsive to said first, second, and third voltages for developing a diaphragm opening control output when switched to said EE mode or a shutter speed control output when switched to said ES mode and for applying said output to said diaphragm opening control means or said shutter speed control means, respectively.

2. An automatic exposure control device as claimed in claim 1 wherein said circuit means comprises switch means for selectively selecting the EE and ES modes of operation, said switch means connecting said third voltage substantially directly to said electromagnetic shutter control means when positioned to select said EE mode, and connecting circuitry for combining said first, second and third voltages to said electromagnetic shutter control means when positioned to select said ES mode.

3. An automatic exposure control device as claimed in claim 1 further comprising an indicator means connected to said circuit, said indicator providing indications of diaphragm and shutter speed values when said circuit is switched into said EE and ES modes respectively.

4. An automatic exposure control device as claimed in claim 3 wherein said indicator is an ammeter and wherein said automatic diaphragm control means is connected to operate under control of the pointer of said ammeter when said circuit is switched into said EE mode.

5. An exposure control device as claimed in claim 1 wherein said first transducer means comprises a photodiode and a log compression transistor having its collector connected to said photodiode, whereby said first voltage is developed across the base-emitter circuit of said log compression transistor, and wherein said second transducer means comprises a variable resistor and a pair of series connected log compression diodes, all connected in series, whereby said second voltage is developed across said pair of log compression diodes.

6. An exposure control device as claimed in claim 1 wherein said third transducer means comprises a variable resistor connected in series with a pair of series connected log compression diodes, whereby said third voltage is developed across said pair of log compression diodes.

7. An exposure control device as claimed in claim 6 wherein said first transducer means comprises a photodiode and a log compression transistor having its collector connected to said photodiode, whereby said first voltage is developed across the base-emitter circuit of said log compression transistor, and wherein said second transducer means comprises a variable resistor and a pair of series connected log compression diodes, all connected in series, whereby said second voltage is developed across said pair of log compression diodes.

8. An exposure control device as claimed in claim 1 wherein said circuit comprises first and second mode selection switches, said first and second switches being connected in said circuit to connect to said electromagnetic shutter control means the sum of said first and second voltages minus said third voltage, when said switches are switched to their respective first positions, corresponding to the ES mode, and to connect to said electromagnetic shutter said third voltage minus a locally generated correction voltage when said switches are in their respective second positions corresponding to the EE mode.

9. An automatic exposure control device as claimed in claim 8 wherein said automatic shutter control means comprises, an electromagnet for holding a shutter in a fixed position, a time constant charge accumulation circuit for altering the energization of said electromagnet depending upon the charge stored therein, and an input circuit comprising a log expansion transistor having its collector connected to said time constant circuit, the case-emitter circuit of said transistor serving as the input terminals of said automatic shutter control means.

* * * * *